May 18, 1954 — R. L. FOWLER — 2,678,699
OIL AND GAS SEPARATOR
Filed Feb. 18, 1952 — 2 Sheets-Sheet 1

RALPH L. FOWLER
INVENTOR.

BY *Hazard & Miller*

ATTORNEYS.

May 18, 1954

R. L. FOWLER 2,678,699

OIL AND GAS SEPARATOR

Filed Feb. 18, 1952

RALPH L. FOWLER
*INVENTOR.*

BY *Hazard & Miller*

ATTORNEYS.

Patented May 18, 1954

2,678,699

UNITED STATES PATENT OFFICE 2,678,699

OIL AND GAS SEPARATOR

Ralph L. Fowler, Whittier, Calif., assignor to Superior Tank & Construction Co., Los Angeles, Calif., a corporation of California Application February 18, 1952, Serial No. 272,194

5 Claims. (Cl. 183—2.7)

This invention relates to oil and gas separators.

A primary object of the invention is to provide an improved oil and gas separator designed to facilitate the separation of gas from oil in the case of very foamy or frothy oils.

More specifically, an object of the invention is to provide an oil and gas separator which operates with a maximum efficiency for a maximum amount of structural steel employed in its construction.

Heretofore, a great majority of oil and gas separators have been constructed in the form of cylindrical steel tanks wherein the influent is spread around the cylindrical walls of the tank by being introduced into the tank in a tangential direction. Under these circumstances the influent swirls around the interior of the tank in the course of its descent and various means are provided for baffling the gas that emanates from the swirling influent. Means are provided for collecting the separated oil and conducting it from the bottom of the tank.

The advantages of using a spherical tank are, of course, well known but heretofore the use of spherical tanks in oil and gas separators has been somewhat limited, principally due to the fact that the shape of the tank has not been ordinarily regarded as conducive to providing interfaces between the liquid and gas of adequate area. The present invention utilizes the advantages that are inherent in the use of a spherical tank but provides interfaces between the liquid and gas which are of adequate area so that the improved separator can be used to advantage in treating oils of a very foamy or frothy nature.

With the foregoing and other objects in view, which will be made manifest in the following detailed description and specifically pointed out in the appended claims, reference is had to the accompanying drawings for an illustrative embodiment of the invention, wherein:

Figure 1:
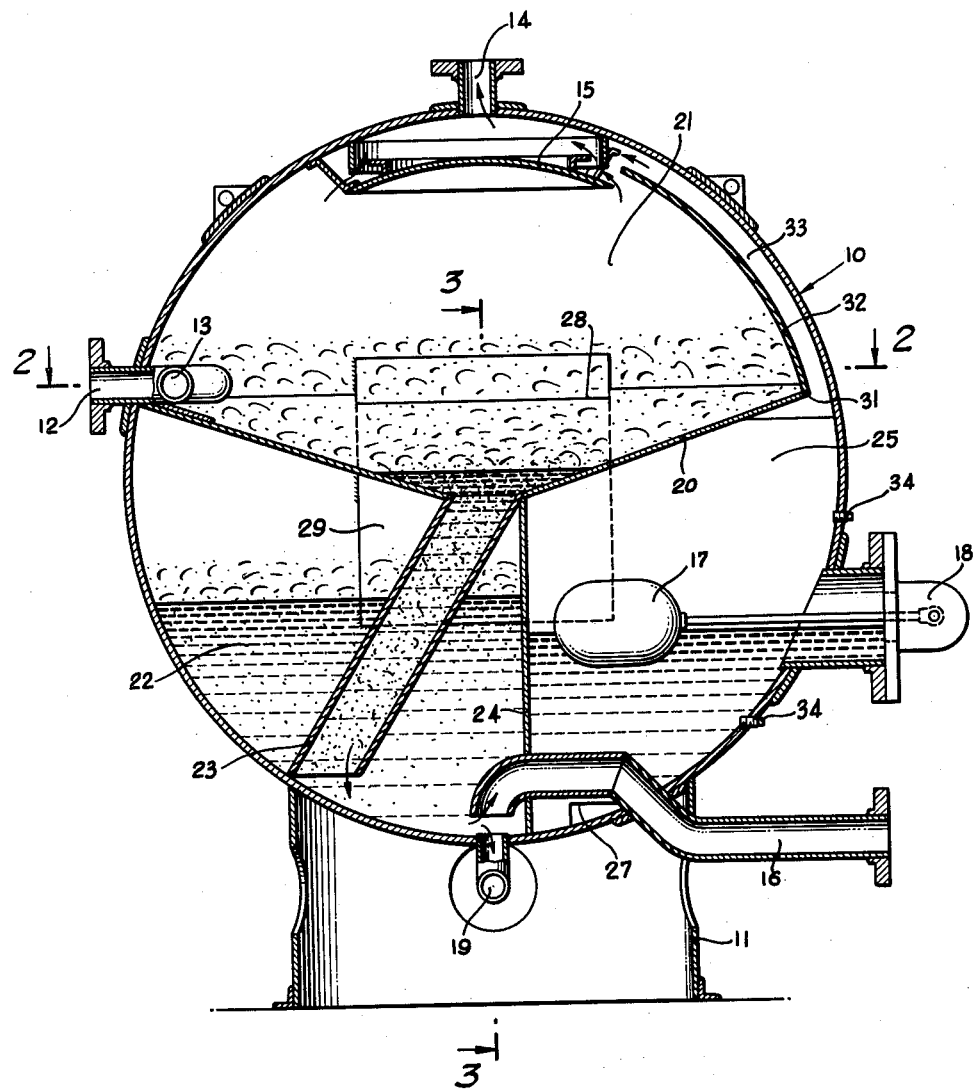
Figure 1 is a vertical section through an oil and gas separator embodying the present invention.
Figure 2:
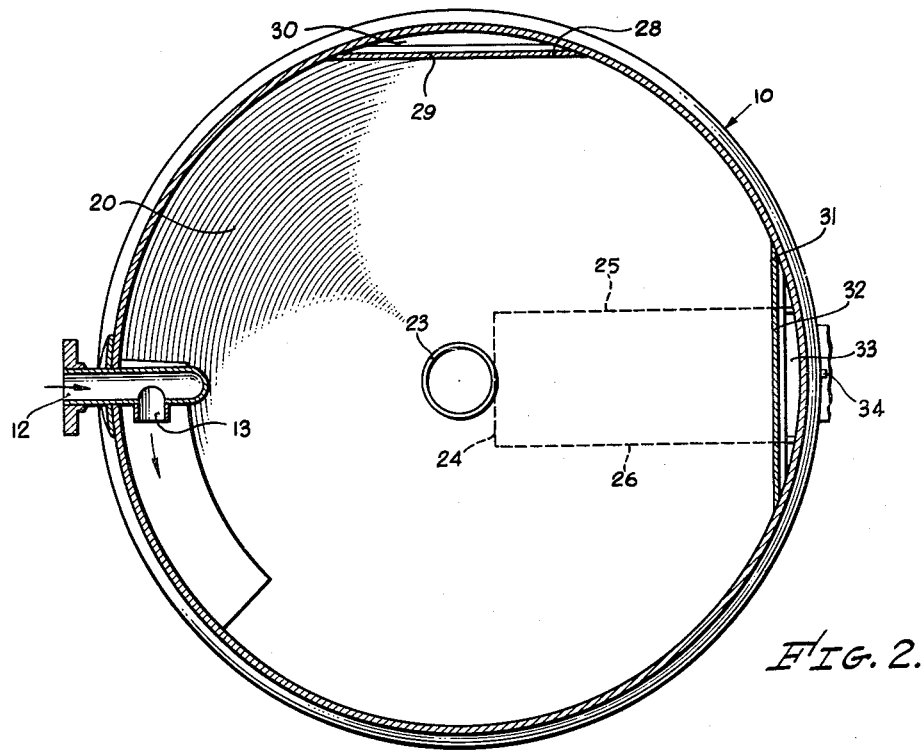
Fig. 2 is a horizontal section taken substantially upon the line 2—2 upon Fig. 1 in the direction indicated.
Figure 3:
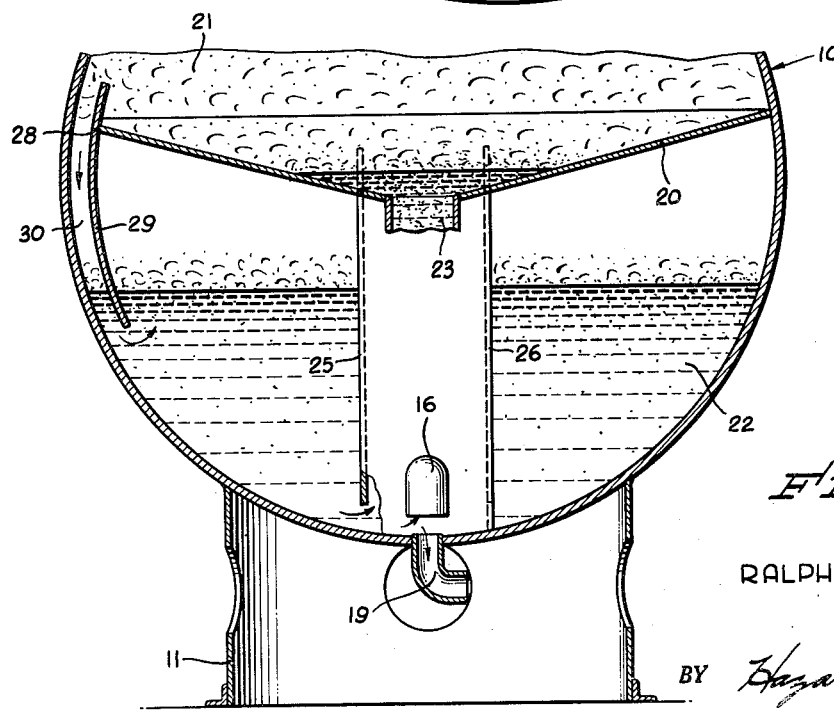
Fig. 3 is a partial vertical section taken substantially upon the line 3—3 upon Fig. 1 in the direction indicated.

Referring to the accompanying drawing wherein similar reference characters designate similar parts throughout, the improved separator consists of a spherical steel tank 10 suitably supported on a cylindrical support or pedestal 11. The inlet for influent to the tank is indicated at 12 and the inner end of this inlet is so arranged as to discharge the influent in a tangential direction as indicated at 13, see Fig. 2.

The gas outlet from the tank is indicated at 14 and in accordance with conventional practice, this outlet is usually provided with a back pressure regulator valve. A baffle, generally indicated at 15, is mounted within the tank beneath the gas outlet. This baffle may be of any conventional or preferred construction and insofar as the present invention is concerned, the use of any particular baffle may be regarded as optional. The primary function of the baffle is to prevent liquid particles from passing into the outlet 14 along with the gas.

The oil outlet is indicated at 16 which extends into the tank adjacent the bottom thereof. This outlet is conventionally equipped with a float-actuated valve, not shown, which is actuated by the float 17 disposed within the tank. The float operates through a fitting 18 to actuate the valve in the outlet 16 so that the outlet is only open when there is liquid in the bottom of the tank to pass into the outlet. At the very bottom of the tank there may be an additional outlet 19 through which sand and sediment may be flushed out of the tank from time to time as occasion may require.

As a means of providing a relatively large primary interface between the oil and the gas to facilitate separation a shallow, conical pan 20 is positioned within the tank at or slightly above the horizontal central plane therethrough. This pan extends from side wall to side wall of the tank except at two locations which will hereinafter be referred to. This pan, in effect, divides the interior of the tank into an upper gas chamber 21 and a lower liquid chamber 22. The pan 20 has an oil drain 23 extending downwardly therefrom to a point adjacent the bottom of the tank. Within the bottom of the tank there are three partitions 24, 25, and 26 which divide the lower portion of the tank into two compartments. One compartment is designed to receive the oil that descends through the oil drain 23. The other compartment provides a quieting chamber around the float 17 so that the float will rise and fall in accordance with the true liquid level in the tank. Ingress into this compartment is made possible through notches 27 that are formed in the bottoms of the partitions 25 and 26.

At one side of the pan the edge of the pan is cut away as indicated at 28 and a plate 29 has its edges welded to the interior of the tank. The central portion of this plate is spaced from the tank wall but it is curved as considered in a vertical direction to conform to the general curvature of the sphere. This plate cooperates with the tank wall to define an overflow passage 30 leading from some distance above the top of the pan to a point well within the liquid compartment 22. In a similar manner, the edge of the pan is recessed or cut away as indicated at 31 and a plate 32 is welded thereto and to the walls of the tank defining a gas passage 33 that extends from above the quieting chamber and from the top of the lower chamber 22 to a point close to the baffle 15.

The operation of the above-described construction is as follows:

If foamy or frothy oil is supplied to the tank through the inlet 12 this foam or froth is spread over the shallow pan 20 and builds up thereon. As this pan extends practically across the entire sphere at about the center thereof an interface of large area is provided wherein a primary separation of gas from oil may take place. The separated oil will tend to collect on the bottom of the pan 20 and drain downwardly therethrough through the oil drain 23. The oil that descends through the oil drain is not necessarily free from gas and frequently does contain a substantial amount of gas although a large portion of the gas is permitted to escape from the oil while it is supported on the pan 20. That gas which is carried with the oil downwardly through the oil drain 23 may separate therefrom and collect in the lower portion of the tank beneath the pan 20. Egress of this gas is provided by the gas passage 33 which conducts it to the upper portion of the tank above the pan. The oil that may enter the float chamber through the notches 27 in the partitions 25 and 26 is usually relatively free of gas and consequently, the float has an opportunity to indicate the approximate true liquid level within the tank. If desired, the float may be supplemented by a sight glass which can be attached to the tank on removal of the plugs 34 so that the oil level within the tank may be visually observed.

It will be appreciated that after the primary separation of gas from oil takes place over the pan 20 that a secondary separation is permitted to take place in the lower portion of the tank so that the oil that is finally delivered to the oil outlet 16 is relatively free of gas. The passage 30 provides an overflow passage. In the event that the oil is extremely frothy and tends to build up to an abnormally high level on the pan 20 the top edge of the plate 29 will function somewhat as a weir permitting the excess of froth to overflow from the pan and pass downwardly into the lower chamber where it may participate in the secondary separation. Ordinarily, the elevation of the top edge of the plate 29 is sufficiently high so that the froth supported on the pan 20 does not build up to this level.

It will be appreciated by those skilled in the art that the advantages of a strong tank having a large volume and employing a minimum amount of steel are retained in this separator in the use of a spherically-shaped tank. However, by the use of the pan 20 at or about a horizontal diameter through the tank a relatively large interface is provided which facilitates the separation of the gas from the oil.

As the spherical tank provides a large volume per unit of steel involved in its construction, it will be appreciated that for the amount of steel used the gas and oil may remain in the tank for a relatively long period of time. The retention of the gas and oil in the tank for as long a period of time as possible enables more complete separation to take place therein.

Various changes may be made in the details of construction without departing from the spirit and scope of the invention as defined by the appended claims.

I claim:

1. An oil and gas separator comprising a spherical tank, a shallow pan extending across the tank adjacent its center, means providing an inlet to the tank discharging onto the pan, an oil drain leading to the bottom of the tank from the pan, means providing an oil outlet from adjacent the bottom of the tank and a gas outlet adjacent the top of the tank, partition means dividing the lower portion of the tank into an oil chamber and a quieting float chamber, a float in the float chamber, and means for conducting gas from said oil chamber and quieting chamber to the upper portion of the tank above the pan.

2. An oil and gas separator comprising a spherical tank, a shallow pan extending across the tank adjacent its center, means providing an inlet to the tank discharging onto the pan, an oil drain leading to the bottom of the tank from the pan, means providing an oil outlet from adjacent the bottom of the tank and a gas outlet adjacent the top of the tank, partition means dividing the lower portion of the tank into an oil chamber and a quieting float chamber, a float in the float chamber, means for conducting gas from said oil chamber and quieting chamber to the upper portion of the tank above the pan, and means for conducting overflow from the pan to the oil chamber.

3. An oil and gas separator comprising a spherical tank, a pan extending across the tank adjacent its center, means providing an inlet for influent discharged onto the pan, an oil drain leading from the pan to the lower portion of the tank therebeneath, means providing an oil outlet from adjacent the bottom of the tank, and a gas outlet from adjacent the top thereof, means for conducting gas from beneath the pan to adjacent the top of the tank, and means for conducting overflow from the pan to the bottom of the tank.

4. An oil and gas separator comprising a spherical tank, a shallow conical pan extending across the tank adjacent its center, means providing an inlet for discharging influent onto the pan in a tangential direction, an oil drain leading from the bottom of the pan to the lower portion of the tank therebeneath, means providing an oil outlet from adjacent the bottom of the tank and a gas outlet from adjacent the top thereof, means for conducting gas from beneath the pan around the edge of the pan to adjacent the top of the tank, and means providing an overflow passage around the edge of the tank from above the pan to beneath the pan within the tank.

5. An oil and gas separator, a spherical tank and a shallow, conical pan extending diametrically across the tank at about the center thereof, an oil drain leading from the pan to the bottom of the tank, and means for discharging influent onto the pan in a tangential direction, there being oil and gas outlets from the tank adjacent the bottom and top thereof respectively.

References Cited in the file of this patent

UNITED STATES PATENTS

| Number | Name | Date |
|---|---|---|
| 2,016,641 | Lincoln | Oct. 8, 1935 |
| 2,181,688 | Walker | Nov. 28, 1939 |
| 2,489,370 | Fowler | Nov. 29, 1949 |
| 2,511,351 | Laidley | June 13, 1950 |